United States Patent [19]
Elliot-Moore et al.

[11] Patent Number: 5,558,761

[45] Date of Patent: Sep. 24, 1996

[54] FLUID FILTERING UNIT WITH MOVABLE COLLECTOR FOR CLEANING

[75] Inventors: Peter Elliot-Moore, Alsager; Christopher Oziem, Lymm, both of England

[73] Assignee: Longwall Roof Supports Limited, Wigan, England

[21] Appl. No.: 378,856

[22] Filed: Jan. 25, 1995

[30] Foreign Application Priority Data

Jul. 1, 1994 [GB] United Kingdom .................. 9413216

[51] Int. Cl.⁶ .......................... B01D 24/38; B01D 24/46
[52] U.S. Cl. ....................... 210/106; 210/143; 210/414; 55/294; 55/302
[58] Field of Search .................................... 210/106, 107, 210/108, 333.1, 411, 413, 414, 143; 55/502, 503, 283, 294, 302

[56] References Cited

U.S. PATENT DOCUMENTS

| | | | |
|---|---|---|---|
| 3,994,810 | 11/1976 | Schaeffer | 210/108 |
| 4,042,504 | 8/1977 | Drori | 210/406 |
| 4,278,540 | 7/1981 | Drori | 210/108 |
| 4,295,963 | 10/1981 | Drori | 210/108 |
| 4,299,707 | 11/1981 | Neuman | 210/291 |
| 4,532,036 | 7/1985 | Clifford | 210/167 |
| 4,549,961 | 10/1985 | Bellemann et al. | 210/108 |
| 4,632,757 | 12/1986 | Rosenberg | 210/414 |
| 4,755,290 | 7/1988 | Neuman et al. | 210/414 |

FOREIGN PATENT DOCUMENTS

| | | |
|---|---|---|
| 377709 | 4/1985 | Austria . |
| 392217 | 2/1991 | Austria . |
| 1547591 | 6/1979 | United Kingdom . |
| 1569448 | 6/1980 | United Kingdom . |
| 2137895 | 10/1984 | United Kingdom . |

*Primary Examiner*—Joseph W. Drodge
*Attorney, Agent, or Firm*—Young & Thompson

[57] ABSTRACT

The fluid filtering unit comprises a filter element through which fluid being filtered must pass and a device for cleaning the filter element in situ without interruption of the filtering process. The cleaning device comprises a collector movable between a first position and a second position relative to the filter element on the upstream side of the filter element during a cleaning operation, a device for urging the collector at least in use towards its first position relative to the filter element, an arrangement for moving the collector from its first position to its second position relative to the filter element against the force of the urging device, and a valve arrangement for automatically connecting the collector to dump at a pressure less than that of the fluid being filtered as the collector moves from its first position relative to the filter element towards its second position relative to the filter element.

9 Claims, 2 Drawing Sheets

FLUID FILTERING UNIT WITH MOVABLE COLLECTOR FOR CLEANING

This invention relates to a fluid filtering unit.

SUMMARY OF THE INVENTION

According to the present invention there is provided a fluid filtering unit comprising a filter element through which fluid being filtered must pass and means for cleaning the filter element in situ without interruption of the filtering process, the cleaning means comprising a collector movable between a first position and a second position relative to the filter element on the upstream side of the filter element during a cleaning operation, means for urging the collector at least in use towards its first position relative to the filter element, means for moving the collector from its first position to its second position relative to the filter element against the force of the urging means, and means for automatically connecting the collector to dump at a pressure less than that of the fluid being filtered as the collector moves from its first position relative to the filter element towards its second position relative to the filter element so that filtered fluid on the downstream side of the filter element will pass to dump via the filter element and the collector to force contaminants collected by the upstream side of the filter element into the collector and to progressively clean the filter element as the collector moves relative to the filter element.

Preferably, the collector is urged towards its first position relative to the filter element by differential pressure acting in use on the collector or the filter element.

Preferably, the collector and filter element are movable relative to one another by means operated by fluid pressure sourced externally of the filter unit.

Conveniently, the collector is in the form of a piston slidable along the upstream side of the filter element. In this case, the piston may have an annular groove adjacent to the filter element, at least one radial passage communicating the groove to dump and at least one axial passage providing communication between opposite sides of the piston.

Preferably, the means for automatically connecting the collector to dump comprises valve means having a first valve part fixed relative to the collector and a second valve part fixed relative to a housing containing the filter element.

Preferably, the filter element is mounted on the downstream side of an apertured, cylindrical filter support and the collector is movable relative to the filter support in close proximity to the filter support during a cleaning operation. In this case, preferably, the apertures in the filter support have a diameter (or equivalent dimension) less than one width of lands on opposite sides of the annular groove in the piston so that flow of unfiltered fluid to dump is choked.

Preferably, the collector and filter element are so arranged that the entire surface area of the filter element can be cleaned during a cleaning operation.

The invention will now be more particularly described, by way of example, with references to the accompanying drawings.

DESCRIPTION OF THE PREFERRED EMBODIMENT

Figure 1:
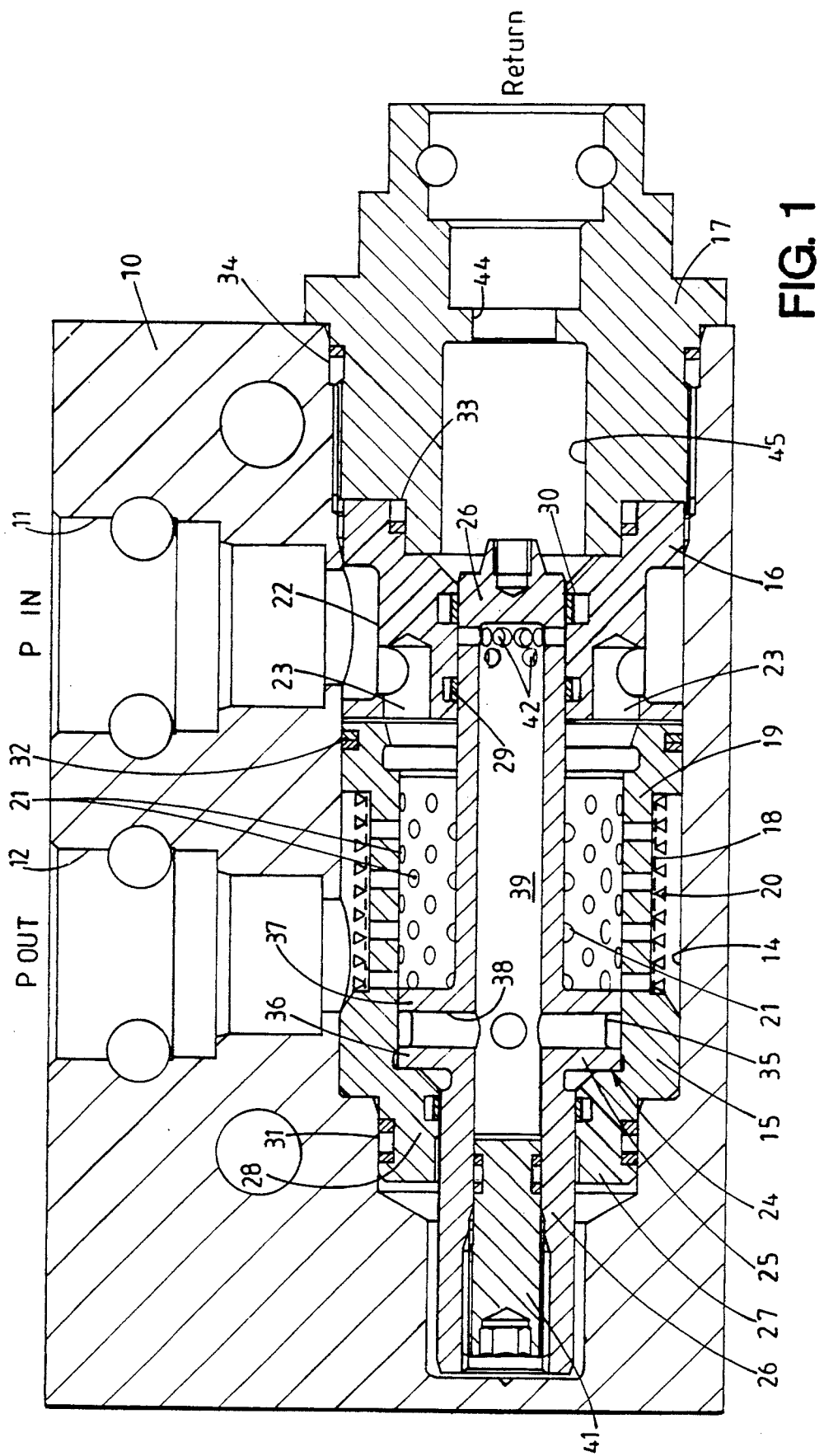
FIG. 1 is a longitudinal section taken through one embodiment of a fluid filtering unit according to the invention.
Figure 2:
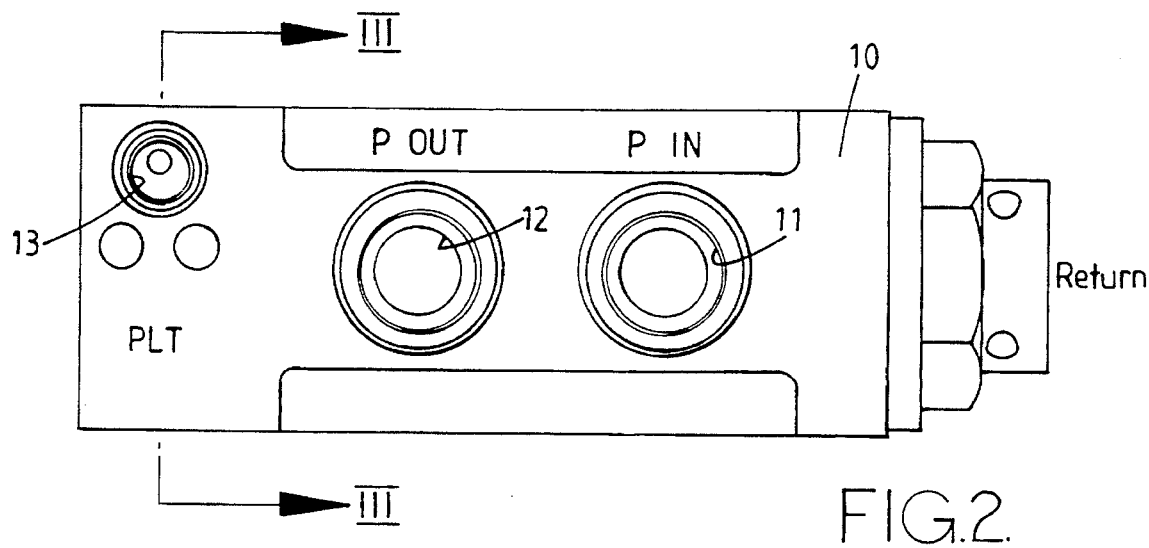
FIG. 2 is a side view of the filtering unit shown in FIG. 1.
Figure 3:
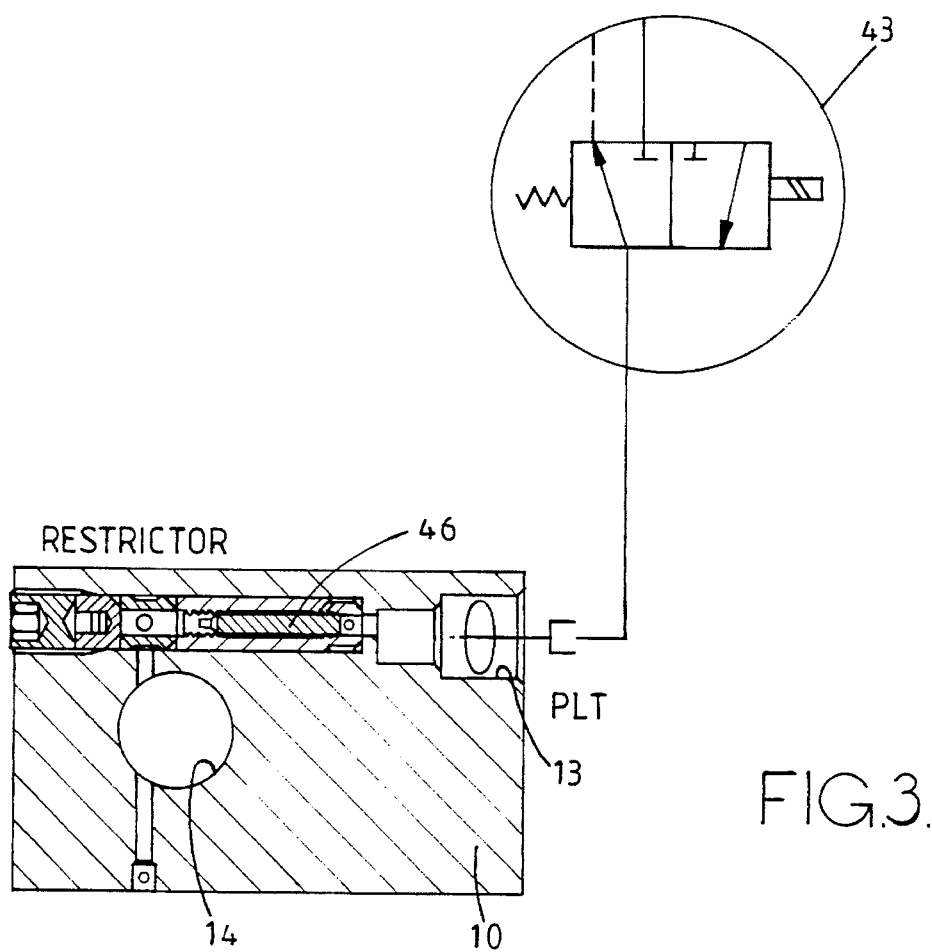
FIG. 3 is a section taken along line III—III of FIG. 2.

Referring to the drawings, the fluid filtering unit shown therein comprises a housing 10 having an inlet port 11, an outlet port 12, and a pilot port 13. The housing 10 also has a blind, stepped chamber 14 accommodating three removable parts 15, 16 and 17 which are fixed in position relative to the housing 10.

The part 15 has in its outer peripheral surface an annular groove 18 which communicates with the outlet port 12 in the housing 10. The base of the groove 18 defines the outer surface of a cylindrical filter support 19. A filter element 20 of wedge wire construction is wound or otherwise mounted on the outer surface of the support 19 and the support 19 has a plurality of radial apertures 21 therein which are arranged in annular spaced apart rows. As an alternative, the filter element 20 could be of flat weave construction mounted on the support 19 to give it collapse strength and having an apertured cylinder against its outer surface to provide burst strength.

The part 16 has in its outer peripheral surface an annular groove 22 which communicates with the inlet port 11 in the housing 10 and the part 16 also has passages 23 which provide fluid communication between the groove 22 and the interior of the part 15.

The part 17 defines a return passage 45 which is, in use, connected to drain.

The fluid filtering unit also comprises a collector 24 movable within the part 15. The collector 24 comprises a piston 25 movable relative to the filter support 19 in close proximity to the upstream side of the filter support 19 during a cleaning operation and an integral piston rod 26 slidably supported at one end by an end portion 27 of the part 15 and at the other end by the part 16. A seal 28 is provided between the end portion 27 of the part 15 and the piston rod 26. Two spaced apart seals 29 and 30 are provided between the piston rod 26 and the part 16. Seals 31 and 32 are provided between the part 15 and the housing 10. A seal 33 is provided between the parts 16 and 17. A seal 34 is provided between the part 17 and the housing 10.

The piston 25 has an annular groove 35 defined between two annular lands 36 and 37 which are a fairly close fit (but not a sealing fit) within the part 15. The piston also has at least one, and typically four, radial passages 38 which communicate the annular groove 35 with an axial passage 39 formed in the piston rod 26. The piston 25 also has at least one, and typically eight, axially extending passages (not shown) disposed between adjacent pairs of radial passages 38 providing communication between opposite sides of the piston 25. The left hand end of the axial passage 39 (as viewed in FIG. 1) in the piston rod 26 is closed by a plug 41 and a plurality of radially extending apertures 42 are provided in the piston rod 26 at the right hand end thereof and communicate with the passage 39. When the piston 25 is in its extreme left hand position (as shown in FIG. 1), fluid in the passage 39 is prevented from flowing to drain via the return passage 45 in the part 17 by the seal 30. However, when the piston 25 is moved to the right (as viewed in FIG. 1) to bring the apertures 42 to the right of the seal 30, the passage 39 communicates with drain via the return passage 45 in the part 17.

The left hand end of the chamber 14 communicates with the pilot port 13 via a restrictor 46 and, in use, the pilot port 13 is connected selectively to drain or fluid under pressure by an external solenoid operated valve 43.

When the pilot port 13 is connected to drain, a pressure differential across the collector 24 (resulting from the different diameters of seals 28 and 29) keeps the piston 25 in its extreme left hand position. Fluid entering the housing 10 via the inlet port 11 will pass into the part 15 via the groove 22 and passages 23 in the part 16, and will be filtered by the filter element 20 before leaving the housing 10 via the outlet port 12.

When the pilot port 13 is connected to fluid under pressure, the piston 25 is moved to the right and, as soon as the axial passage 39 in the piston rod 26 communicates with the return passage 45 in the part 17 (i.e. when the apertures 42 move to the right of the seal 30), high pressure filtered fluid on the downstream side of the filter element 20 forces contaminants collected on the upstream side of the filter element 20 into the piston 25 and to drain. The piston 25 will sweep the entire surface area of the filter element 20 to progressively clean the filter element 20 and will come to a rest when the piston rod 26 makes contact with a radially inwardly projecting shoulder 44 on the part 17. The speed at which the piston 25 sweeps past the filter element 20 is controlled by the restrictor 46. The piston 25 then remains at its extreme right hand position until the valve 43 is operated to again connect the pilot port 13 to drain. When this happens, the pressure at the pilot end of the chamber 14 will decay slowly through the restrictor 46 and the pressure differential across the collector 24 (resulting from the different diameters of seals 28 and 29) will return the piston 25 to its extreme left hand position. During this return movement of the piston 25, high pressure filtered fluid on the downstream side of the filter element 20 will again force any remaining contaminants collected on the upstream side of the filter element into the piston and to drain. As the piston 25 approaches, its extreme left hand position the axial passage 39 in the piston rod 26 will be cut off from the return passage 45 to prevent any further flow of filtered fluid to drain. Filtering of fluid will continue during the cleaning operation.

The width of the lands 36 and 37 on either side of the annular groove 35 in the piston 25 is greater than the diameter of the apertures 21 in the filter support 19 to choke flow of unfiltered fluid to drain via the collector 24 as the piston 25 traverses the filter support 19.

The solenoid operated valve 43 could be operated by a computer or by a sensor (not shown) responsive to the degree of contamination of the filter element 20. It could also be replaced by a manually operatable valve.

The embodiment described above is given by way of example only and various modifications will be apparent to persons skilled in the art without departing from the scope of the invention. For example, return movement of the piston to its extreme left hand end could be effected by the urging force of a spring instead of by differential pressure across the collector.

What is claimed is:

1. A fluid filtering unit comprising a filter element through which fluid being filtered must pass and means for cleaning the filter element in situ without interruption of fluid filtration, the cleaning means comprising a collector movable between a first position and a second position relative to the filter element on the upstream side of the filter element during a cleaning operation, means for urging the collector towards its first position relative to the filter element, means for moving the collector from its first position to its second position relative to the filter element against a force of the urging means, and means for automatically connecting the collector to dump fluid to a drain at a pressure less than that of the fluid being filtered as the collector moves from its first position relative to the filter element towards its second position relative to the filter element so that filtered fluid on the downstream side of the filter element will pass to dump via the filter element and the collector to force contaminants collected by the upstream side of the filter element into the collector and to progressively clean the filter element as the collector moves relative to the filter element.

2. A fluid filtering unit as claimed in claim 1, wherein the collector is urged towards its first position relative to the filter element by differential pressure acting on the collector or the filter element.

3. A fluid filtering unit as claimed in claim 1, wherein the collector and filter element are movable relative to one another by means operated by a source of fluid pressure located outside of the filter unit.

4. A fluid filtering unit as claimed in claim 1, wherein the collector is in the form of a piston slidable along the upstream side of the filter element.

5. A fluid filtering unit as claimed in claim 4, wherein the piston has an annular groove adjacent to the filter element, at least one radial passage communicating the groove to the drain and at least one axial passage providing communication between opposite sides of the piston.

6. A fluid filtering unit as claimed in claim 5, wherein the filter element is mounted on the downstream side of an apertured, cylindrical filter support and the piston is movable relative to the filter support in close proximity to the filter support during a cleaning operation and wherein the apertures in the filter support have a diameter less than the width of lands on opposite sides of the annular groove in the piston so that flow of unfiltered fluid being dumped to the drain is choked.

7. A fluid filtering unit as claimed in claim 1, wherein the means for automatically connecting the collector to dump comprises valve means having a first valve part fixed relative to the collector and a second valve part fixed relative to a housing containing the filter element.

8. A fluid filtering unit as claimed in claim 1, wherein the filter element is mounted on the downstream side of an apertured, cylindrical filter support and the collector is movable relative to the filter support in close proximity to the filter support during a cleaning operation.

9. A fluid filtering unit as claimed in claim 1, wherein the collector and filter element are so arranged that the entire surface area of the filter element can be cleaned during a cleaning operation.

\* \* \* \* \*

UNITED STATES PATENT AND TRADEMARK OFFICE
CERTIFICATE OF CORRECTION

PATENT NO. : 5,558,761
DATED     : September 24, 1996
INVENTOR(S) : Peter ELLIOTT-MOORE et al.

It is certified that error appears in the above-indentified patent and that said Letters Patent is hereby corrected as shown below:

On the Title Page:

On the title page, Item 19, change the inventor's surname from "Elliot-Moore" to --Elliott-Moore--.

In Item 75, change the inventor's name from "Peter Elliot-Moore" to --Peter Elliott-Moore--.

Signed and Sealed this

Twenty-sixth Day of November 1996

Attest:

BRUCE LEHMAN

*Attesting Officer*     *Commissioner of Patents and Trademarks*